United States Patent
Miyake et al.

(10) Patent No.: US 7,168,022 B2
(45) Date of Patent: Jan. 23, 2007

(54) TRANSMISSION CONTROL METHOD AND SYSTEM

(75) Inventors: Motoharu Miyake, Yokosuka (JP); Hiroshi Inamura, Yokohama (JP); Taro Ishikawa, Kawasaki (JP); Kazuhisa Yokota, Yokohama (JP); Osamu Takahashi, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 560 days.

(21) Appl. No.: 10/743,635

(22) Filed: Dec. 22, 2003

(65) Prior Publication Data

US 2004/0176947 A1 Sep. 9, 2004

(30) Foreign Application Priority Data

Dec. 27, 2002 (JP) ............................. 2002-382221

(51) Int. Cl.
G08C 25/02 (2006.01)
H04L 1/18 (2006.01)

(52) U.S. Cl. ................... 714/748; 714/749; 370/412

(58) Field of Classification Search ........ 714/748–751; 370/412

See application file for complete search history.

(56) References Cited

U.S. PATENT DOCUMENTS 4,397,018 A * 8/1983 Fennel et al. ............... 370/324
6,493,334 B1 * 12/2002 Krzymien et al. .......... 370/342
6,700,893 B1 * 3/2004 Radha et al. ............... 370/412

FOREIGN PATENT DOCUMENTS

JP H07-123079 A 5/1995
JP 2002-354010 A 12/2002

OTHER PUBLICATIONS

Ludwig, R. et al., "The Eifel Detection Algorithm for TCP", Jul. 24, 2002, 10 pages.
Allman M. et al., "On Estimating End-to-End Network Path Properties" *ACM SIGCOMM Computer Communication Review*, vol. 29, Issue 4, Oct. 1999, pp. 263-274.

* cited by examiner

Primary Examiner—Guy J. Lamarre
(74) Attorney, Agent, or Firm—Brinks Hofer Gilson & Lione

(57) ABSTRACT

A first elapsed time from transmission of a data segment until receipt of an acknowledgement is measured. A probability distribution of the first elapsed time is generated for a client device 50 on the basis of the measured first elapsed time. A second elapsed time from retransmission of a data segment until receipt of an acknowledgement is measured. A probability distribution of the second elapsed time is generated for a client device 50 on the basis of the measured first elapsed time. An estimation is made as to whether an acknowledgment pertains to which data segment on the basis of the generated probability distribution.

17 Claims, 7 Drawing Sheets

TRANSMISSION CONTROL METHOD AND SYSTEM

TECHNICAL FIELD

This relates to a technique for controlling retransmission of data in a communication network.

BACKGROUND ART

Devices that use TCP (Transmission Control Protocol) for transmitting and receiving data are now commonly employed. TCP is a protocol used under the OSI (Open Systems Interconnection) Reference Model, and is used when data streamed from an upper layer are divided into data segments for transmission from a sender device to a receiver device. TCP ensures reliable streaming of ordered data segments to a receiver device. Specifically, a sender device assigns information for indicating an order of data (hereinafter referred to as "a sequence number") to each data segment. The sender device sets the sequence number in a data header upon transmission of a data segment, and initializes a timer at the same time. If there is no acknowledgement from the receiver device of receipt of a transmitted data segment within a projected time (Timeout), the time being determined on the basis of an estimated time for transmission of the data segment to its reception and acknowledgement of its receipt (i.e., estimated round trip time of the data segment), the sender device tentatively determines that the data segment has been lost without reaching the receiver device and retransmits the data segment to the receiver device.

At a sender device, when an acknowledgement is received, a number contained in a header of the received acknowledgement indicates which data segment the received acknowledgement corresponds to. When the receiver device transmits an acknowledgement, it sets a sequence number of a data segment which it expects to receive next in the "acknowledgement number" field in the header of the acknowledgement. For instance, when using sequence numbers starting from 500 and followed by 1000, 1500 etc., an acknowledgement number of an acknowledgement to be transmitted to a sender device is set as 1000 once a data segment having a sequence number "500" is received. Upon receiving such an acknowledgment, the sender device determines that a transmitted data segment has been safely received by a receiver device and transmits a subsequent data segment.

It is to be noted that a sender device receives an acknowledgment having an acknowledgment number 1000 where the sender device has not transmitted a data segment having a sequence number 1000, or where, even if the data segment has been transmitted, the segment has not been received by a receiver device. This acknowledgement number remains set at 1000 until a data segment containing a sequence number 1000 is received at the receiver device even where a subsequent data segment having a sequence number 1500 is already received at a receiver device due to a loss of the data segment having a sequence number 1000. Thus, a sequence number of the least recent data segment which is not received by a receiver device is set as an acknowledgement number.

In the data segment transmission method explained above, reliability is ensured by transmitting from a sender device a subsequent data segment only after receipt at the device from a receiver device of an acknowledgement for a previously transmitted data segment. However, while this method ensures data transmission reliability it inhibits efficiency. To improve efficiency, TCP provides a method for transmitting a certain number of data segments according to a number defined by a "window." A "window" is a number of bytes or a number of data segments that can be transmitted prior to receipt of an acknowledgement. A window size is determined by a sender device such that it does not exceed an available buffer size of a receiver device. When a sender device receives an acknowledgement for a transmitted data segment(s), a window slides by the number of data segments for which an acknowledgement has been received, and a subsequent data segment(s) is transmitted to the extent by which the window has slid. This method is referred to as a "sliding window method"; and by controlling a window size, data flow is controlled.

If data flow is suspended when a sliding window method is being employed, due to, for example, a break in wireless communication or congestion in a system, transmitted data segments may either be lost in the system or need to be stored temporarily in a node in the network until data communication is restored. Especially, deterioration is more likely to happen in a wireless communication environment. Following restoration of data communication any data segments that are temporarily stored in a node in the network are able to reach the receiver device, albeit with some delay.

However, if communication disruption persists for a relatively long time, and a timeout occurs at a sender device for a transmitted data segment, the sender device retransmits a first data segment from among data segments that have thus far been transmitted but not acknowledged. As a result, the receiver device receives both the data segment temporarily stored in the network (hereinafter referred to as "an original data segment") and the retransmitted data segment. The receiver device then returns an acknowledgement for the original data segment upon its receipt, and also transmits an acknowledgement for the retransmitted data segment upon its receipt, with each of these acknowledgments normally having the same acknowledgment number. This gives rise to a problem that the sender device is unable to determine whether an acknowledgment received pertains to an originally transmitted or to a retransmitted data segment, and consequently reverts to a state where it is determined that the original data segment failed to reach the receiver device. In the following, an example is given to explain in detail why such a determination is performed.

FIG. 9 is an example sequence diagram showing a case where a packet communication is performed between a server device 10' (a sender device) and a client device 50 (a receiver device). A 4-digit-number appearing to the right of an initial point of each arrow at server device 10' in the figure is a sequence number of a data segment transmitted from server device 10'; and a 4-digit-number appearing to the left of an initial point of each arrow at receiver device 50 in the figure is an acknowledgement number included in an acknowledgement transmitted from client device 50. It is assumed here that an original sliding window size is three, i.e., three data segments may be sent without receiving an acknowledgement.

In FIG. 9, three data segments (original data segments) S1–S3 are transmitted for a first time from server device 10', the data segments S1, S2, and S3 having sequence numbers 0, 1000, and 2000, respectively. A timer is set at server device 10' upon transmission of the data segments.

In the figure, the data segments S1, S2, and S3 are received at client device 50 with a delay due to deterioration in network communication conditions. Client device 50, upon receiving the original data segment S1, transmits to server device 10' an acknowledgement R1 having acknowledgment number 1000. Likewise, upon receiving original data segment S2, client device 50 transmits an acknowledgement R2 having acknowledgment number 2000, and an acknowledgement R3 having acknowledgment number 3000 upon receiving original data segment S3.

As shown in the figure, server device 10' does not receive an acknowledgement from receiver device 50 before an elapsed time measured by a timer exceeds a timeout value. As a result, server device 10' determines that the original data segment S1 has not been received by client device 50 at the time of timeout, and retransmits a data segment having sequence number 0 (retransmitted data segment S'1). One data segment, i.e., retransmitted data segment S'1, is transmitted here because a window size is reduced to a minimum value upon timeout.

Server device 10' subsequently receives an acknowledgement R1 having an acknowledgement number 1000. Here, server device 10' is unable to determine on the basis of the acknowledgement number 1000 whether the acknowledgement R1 pertains to original data segment S1 or to retransmitted data segment S'1, for the reason stated above. Therefore, server device 10' treats acknowledgement R1 as pertaining to retransmitted data segment S'1, and a data segment having sequence number 1000 is therefore retransmitted (retransmitted data segment S'2). Server device 10' further retransmits a data segment having a subsequent sequence number 2000 (retransmitted data segment S'3) because the window size is increased by one after receiving the acknowledgement R1.

Server device 10' subsequently receives an acknowledgement R2 having an acknowledgement number 2000, and subsequent original data segments (original data segment S4 and following original data segments) are sequentially transmitted.

In the example, original data segments S2 and S3 are retransmitted (retransmitted data segments S'2 and S'3) even though they have safely been received at client device 50. That is, since data segments S2 and S3 are received by client device 50 at two different times, the retransmission of data segments S2 and S3 results in unnecessary transmission, although this was not determined at the time of the retransmission. Further, as it is clear from FIG. 9, acknowledgements R'2 and R'3 are also transmitted in response to the retransmitted data segments S'2 and S'3. Thus, a total of four data segments have been unnecessarily transmitted.

Such unnecessary transmission of data segments is not performed if it is determined that an acknowledgement received after retransmission of a data segment pertains to an original data segment in a case where a sender device is unable to determine whether the acknowledgement pertains to the original data segment or the retransmitted data segment.

However, when such a determination is made, an acknowledgment for a retransmitted data segment is regarded as an acknowledgement for an original data segment, wherein a window is slid forwards, causing a subsequent original data segment to be transmitted. When such a transmission of an original data segment is repeated, there is a risk of a cumulative increase in the number of data segments that have been transmitted from server device 10' but that have not reached client device 50.

To avoid such a risk, it is determined by default that an acknowledgement pertains to an original data segment in a case where a sender device is unable to determine whether an acknowledgement pertains to the original data segment or the retransmitted data segment. However, using this determination, a sender device is unable to avoid unnecessary retransmission of a data segment.

To solve this problem, "The Eifel Detection Algorithm for TCP" (Reiner Ludwig, et. al, http://www.watersprings.org/pub/id/draft-ietf-tsvwg-tcp-eifel-alg-04.txt, 24 Jul., 2002) discloses a technique for enabling reliable determination as to whether an acknowledgment pertains to an original data segment or to a retransmitted data segment by using the TCP Time Stamps Option defined in RFC 1323.

Also, in "On Estimating End-To-End Network Path Properties. 2.8 Impact of Bad Timeouts" (Mark Allman, Vern Paxson, ACM SIGCOMM '99, vol.29, no.4, pp 263–274, October 1999), Allman et. al proposes a technique for using statistical information to estimate whether a received acknowledgment pertains to an original data segment or to a retransmitted data segment in packet communication in a wired packet communication network.

In the Allman's proposal, estimation is performed on the basis of ½ of a minimum round trip time as a threshold value, where the minimum round trip time is the smallest value of a plurality of round trip times obtained by measuring a time from which a data segment is transmitted until a time when an acknowledgment for the segment is received while a connection remains alive between a sender device and a receiver device. In the method, if a time which elapses from retransmission of a data segment until a time when a first acknowledgement is received is equal to or longer than (or longer than) the threshold value, the acknowledgement received is regarded as pertaining to the retransmitted data segment; with the elapsed time being less than (or equal to or less than) the threshold value, while the acknowledgment received is regarded as pertaining to the original data segment.

Determination of the threshold time as being a half that of a minimum round trip time is based on the following conditions:

1. Statistically, a probability of an acknowledgement being received for an originally transmitted data segment is about the same during: a period from retransmission until ½ of a minimum round trip time has elapsed; a period from retransmission until ¾ of a minimum round trip time has elapsed; and a period from retransmission until the complete minimum round trip time has elapsed; and 2. Statistically, a probability of receiving an acknowledgement for a retransmitted data segment sharply increases about a time point shortly after. ½ of the minimum round trip time has elapsed since retransmission.

However, when the Eifel Detection Algorithm is used, time stamp information is always appended to an original data segment at a sender device and to an acknowledgement at a receiver device even under good network conditions. This means that the size of both the original data segment and the acknowledgement data segment is increased. The increase in the amount of transmitted data leads to an increase in communication charges where subscribers are charged for communication in proportion to the amount of segments transmitted through a network. Such an undesirable increase in communication charges is likely to become more pronounced where network conditions are good and instances of data retransmission are likely to be small. Clearly, such increases in communication charges are not desirable for either users of receiver devices and sender devices.

It is feasible to include time stamp information in reserved bits of a TCP header used at the time of communication instead of adding the information to a data segment. However, existing communication systems do not support such a method, and consequently, sender and receiver devices would need to be significantly modified to employ such a method.

Further, even when the technique of Allman is used, an optimum result of the determination cannot be obtained in a mobile communication environment where data segment delay is pronounced in a wireless section.

SUMMARY

The present invention is envisioned to solve the above problems, and its object is to provide a technique that enables a reliable determination as to whether an acknowledgement received by a sender device is for an original data segment or for a retransmitted data segment. Specifically, the technique described herein does not increase an amount of data to be transmitted and requires no redesign of a receiver device and a little redesign of a sender device.

To solve the above problem, the present invention provides a transmission control method for use in a communication network, comprising: generating first probability distribution data showing incidence probabilities of data block round trip times; transmitting sequentially a plurality of data blocks from a sender device to a receiver device; retransmitting, from the sender device, a data block, from among the plurality of data blocks, for which no acknowledgement is received and initializing a time keeping means for measuring an elapsed time; obtaining, upon receiving an acknowledgement signal from the receiver device, the elapsed time measured by the time keeping means; and estimating whether the acknowledgement signal acknowledges receipt of one of the plurality of data blocks on the basis of a value of the obtained elapsed time and the first probability distribution, wherein the transmitting step includes further transmitting a data block subsequent to the transmitted plurality of data blocks when it is estimated that in the estimating step that the acknowledgement signal acknowledges receipt of one of the plurality of data blocks. An example of the data block is a data segment according to TCP. Preferably, the receiver device is a mobile communication terminal performing packet communications via a mobile communication network.

In one preferred embodiment, the transmission control method further comprises generating second probability distribution data showing incidence probabilities of the elapsed time using the obtained value of the elapsed time when it is determined that the estimation performed in the estimating step is correct, wherein the estimating step includes performing the estimation on the basis of the obtained value of the elapsed time, and the first and second probability distribution data. Preferably, it may be determined that that the estimation performed in the estimation step is correct when receiving at least two acknowledgment signals requesting the subsequent data block.

In another preferred embodiment, when the plurality of data blocks is transmitted to a plurality of the receiver devices, the first and/or second probability distribution data is generated for each of a plurality of connections established with the plurality of receiver devices. In this case, the estimation is performed upon receiving an acknowledgment from one of the plurality of receiver devices, on the basis of the first and/or second probability distribution data generated for one of the plurality of connections that is established with the one of the plurality of the receiver devices. In still another preferred embodiment, when the plurality of data blocks is transmitted to a plurality of the receiver devices each belonging to different subnetworks, the first and/or second probability distribution data is generated for each of the subnetworks. In this case, the estimation is performed, upon receiving an acknowledgment from one of the plurality of receiver devices, on the basis of the first and/or probability distribution data generated for one of the subnetworks to which the one of the plurality of receiver devices belongs.

Preferably, the first and second probability distribution data may be statistical information obtained before transmitting the plurality of data blocks. In this case, the first and second probability distribution data may be generated by updating the statistical information after transmission of the plurality of data blocks is started. Alternatively, the first and second probability distribution data may be statistical information obtained before starting communication for transmitting the plurality of data blocks, wherein the first and second probability distribution data may be generated by updating the statistical information after starting communication for transmitting the plurality of data blocks.

The present invention further provides a communication device comprising: first generation means for generating first probability distribution data showing incidence probabilities of data block round trip times; transmission means for transmitting sequentially a plurality of data blocks to a receiver device; time keeping means for measuring an elapsed time; retransmission means for retransmitting a data block, from among the plurality of data blocks for which no acknowledgement is received and initializing the time keeping means; obtaining means for obtaining, upon receiving an acknowledgement signal from the receiver device, the elapsed time measured by the time keeping means; and estimation means for estimating whether the acknowledgement signal acknowledges receipt of one of the plurality of data blocks on the basis of a value of the obtained elapsed time and the first probability distribution, wherein the transmitting means further transmits a data block subsequent to the transmitted plurality of data blocks when it is estimated in the estimation step that the acknowledgement signal acknowledges receipt of one of the plurality of data blocks.

In one preferred embodiment, the communication device further comprises second generation means for generating second probability distribution data showing incidence probabilities of the elapsed time using the obtained value of the elapsed time when it is determined that the estimation performed by the estimation means is correct; and wherein the estimating means performs the estimation on the basis of the obtained value of the elapsed time, and the first and second probability distribution data. In addition, the communication device according to the present invention comprises various means for implementing various embodiments as described in the transmission control method.

The present invention further provides a communication system by which the transmission control method is implemented in the above described various embodiments by providing at least two devices having various means which the above communication device comprises.

Further, the present invention provides a program for causing a computer to execute the transmission control method in the above described various embodiments. The program may be stored in various types of recording media such as a magnetic tape, a magnetic disk, a floppy™ disk, an optical recording medium, a magneto-optical recording medium, a DVD (Digital Video Disk), a RAM, and others.

The present invention enables an optimum determination as to whether an acknowledgement received at a sender device pertains to an original data segment or to a retransmitted data segment without increasing the data amount of a data segment. As a result, unnecessary transmission of data segments can be prevented. Also, the present invention requires no redesign of a receiver device and a little redesign of a sender device.

DETAILED DESCRIPTION OF PREFERRED EMBODIMENTS

A preferred embodiment of the present invention will be described hereinafter with reference to the attached drawings. To avoid unnecessary description, descriptions of components are not repeated.

A. First Embodiment

1. Configuration

Figure 1:
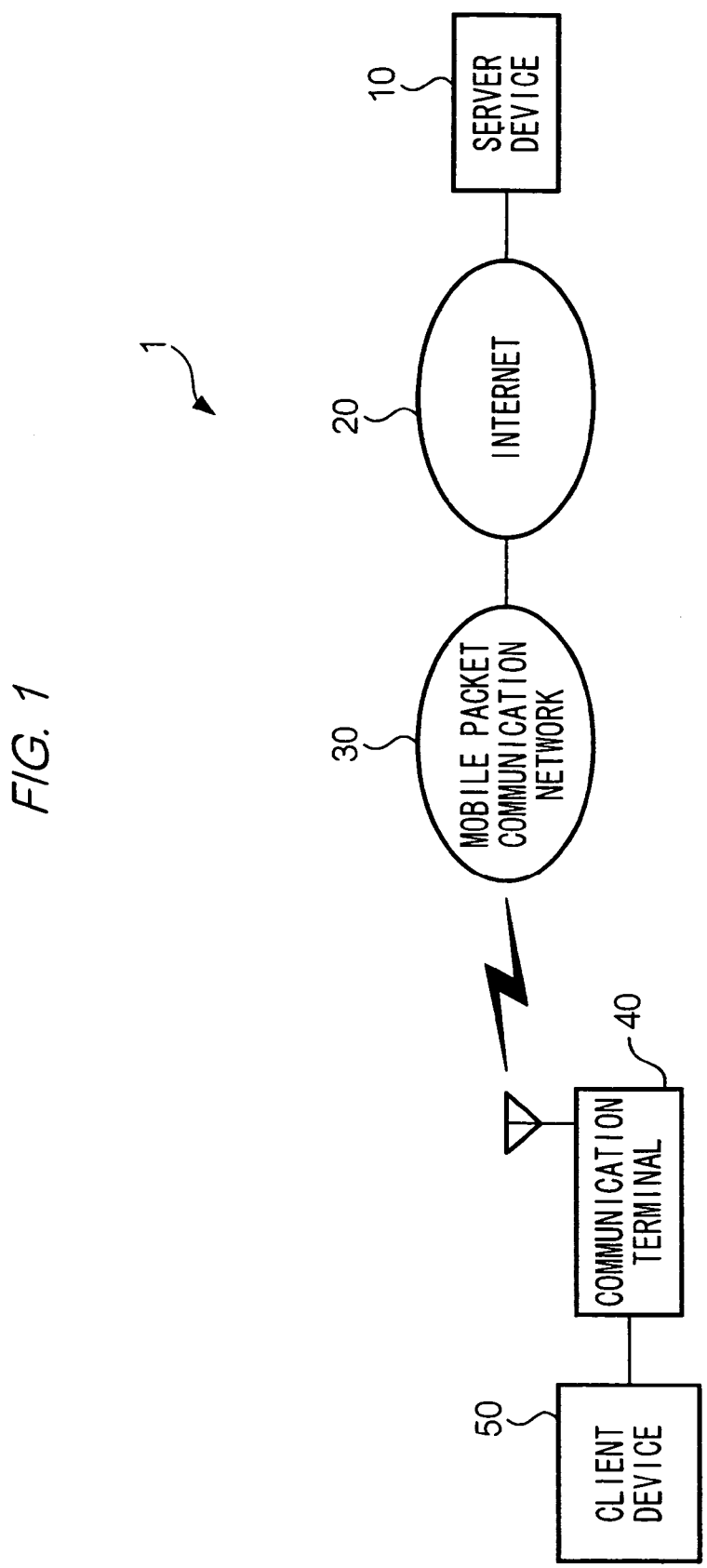
FIG. 1 is a block diagram showing an example configuration of a communication system 1 according to first and second embodiments.

Configuration of Communication System 1:

FIG. 1 is a block diagram showing an example configuration of a communication system 1 according to a first embodiment.

A communication terminal 40 is connected to a client device 50 and performs communications with client device 50.

A mobile packet communication network 30 provides packet communication services to communication terminals 40 served by the network 30. A communication section between the network 30 and communication terminal 40 includes a wireless section (not shown). Radio waves are used to communicate via the wireless section.

A server device 10 performs packet communications with client device 50 via communication terminal 40, mobile packet communication network 30, and the Internet 20. It is assumed here that packet communications are performed in accordance with TCP (Transmission Control Protocol), and that data segments are thereby transmitted.

Figure 2:
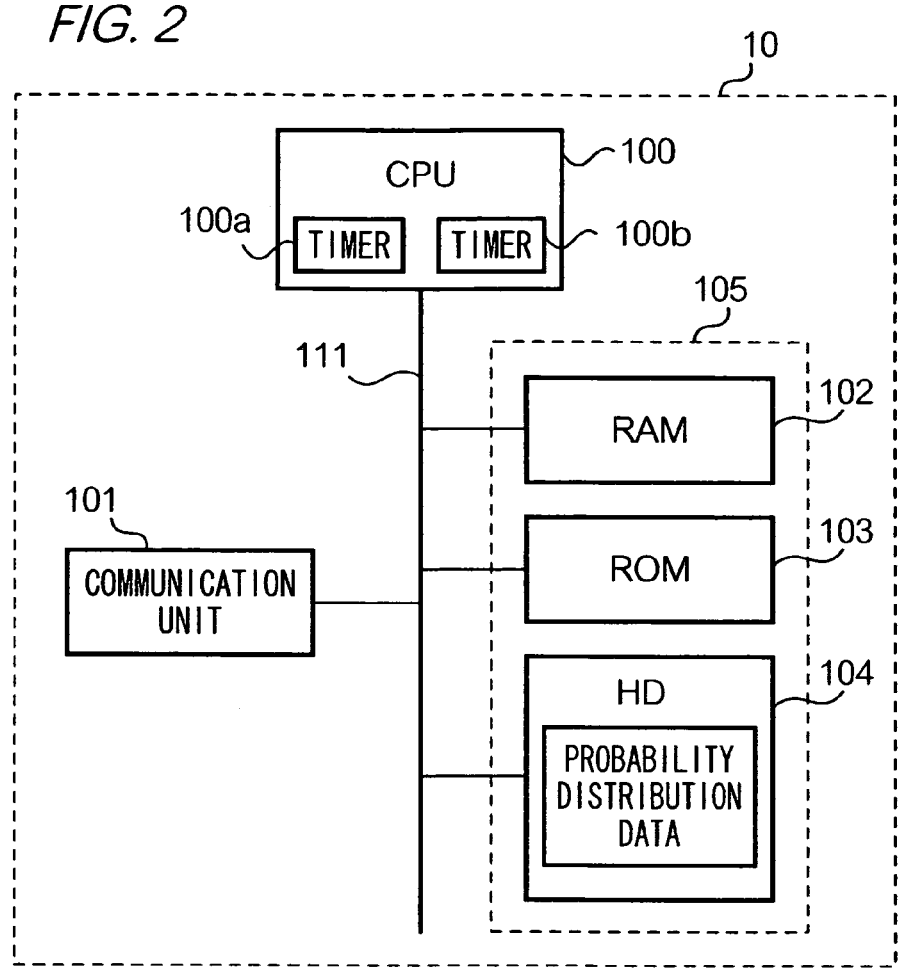
FIG. 2 is a block diagram showing an example configuration of a server device 10 according to the embodiments.

Configuration of Server Device 10:

Next, a configuration of server device 10 will be described. Descriptions relating to FIG. 2 will be given only for components related to the embodiment since server device 10 is configured in the same way as a standard computer.

A CPU 100 controls each component of server device 10 by executing a program stored in a storage unit 105.

CPU 100 further comprises timers 100a and 100b. Timer 100a outputs a trigger signal when a timeout value set by CPU 100 expires. Timer 100a measures a time (hereinafter referred to as "a round trip time") from transmission of a data segment until reception of an acknowledgement of receipt of the data segment. As in a conventional method, a round trip time measured by timer 100a is used for computing a timeout value. The timeout value is a variable determined based on a continuously changing communication environment. Further, in the present embodiment, the round trip time measured by timer 100a is used for generating probability distribution data (see FIG. 3, detailed later).

It is to be noted that, in general, a round trip time is measured for a single data segment for each window, but it is further possible to measure a round trip time for every data segment of the window for use in updating a timeout value or probability distribution.

Timer 100b operates only when a data segment is retransmitted. Specifically, timer 100b starts measuring an elapsed time, on being instructed by CPU 100, when a data segment is retransmitted; and it stops the measuring operation, by instruction of CPU 100, when an acknowledgement of the data segment is received. The value of the elapsed time measured by timer 100b is supplied to CPU 100. The value is then compared to probability distribution data, and it is estimated whether the received acknowledgement corresponds to the original data segment or to the retransmitted data segment.

Storage unit 105 comprises a RAM (Random Access Memory) 102 and a ROM (Read Only Memory) 103, and a HD (Hard Disk) 104. ROM 103 stores a program for causing CPU 100 to execute a data segment transmission control process. Specifically, CPU 100, according to the program, transmits a data segment (hereinafter referred to as "an original data segment") to client device 50, and then waits for an acknowledgement of receipt of the transmitted data segment. CPU 100 also sets timer 100a for a timeout value to measure an elapsed time when transmitting an original data segment.

It is possible that an acknowledgement may not be received before the timeout; for example, when communication conditions deteriorate in a radio environment in a wireless section of a communication section between communication terminal 40 and mobile packet communication network 30. In such a case, a trigger signal is output from timer 100a indicating that the timeout value has expired without receipt of an acknowledgement. CPU 100 then determines that the data segment has not been received by client device 50. Subsequently, CPU 100 reinitializes timer 100a and retransmits the same data segment. Timer 100b is also caused to measure an elapsed time when the data segment is retransmitted.

It is assumed here that the communication through mobile packet communication network 30 is restored after an improvement in communication conditions in the radio environment, and that data segments and acknowledgements can now be transmitted and received. When server device 10 receives an acknowledgement, CPU 100 resets timer 100a and causes timer 100b stop measuring an elapsed time. CPU 100 then uses the elapsed time measured by timer 100b and the probability distribution data (described later in the description) to determine whether the received acknowledgement is more likely to correspond to the original data segment or to the retransmitted data segment.

In a case where it is more probable that the acknowledgement corresponds to the original data segment, CPU 100 estimates that the original data segment has been received by client device 50. CPU 100 then transmits a subsequent original data segment to client device 50. In a case where it is more probable that the acknowledgement corresponds to the retransmitted data segment, CPU 100 estimates that the original data segment has not been received by client device 50. CPU 100 then determines whether there is a subsequent data segment for retransmission, and if there is, it transmits the subsequent data segment for retransmission. In the case that there is no data segment for retransmission, CPU. 100 transmits a subsequent original data segment.

Figure 3:
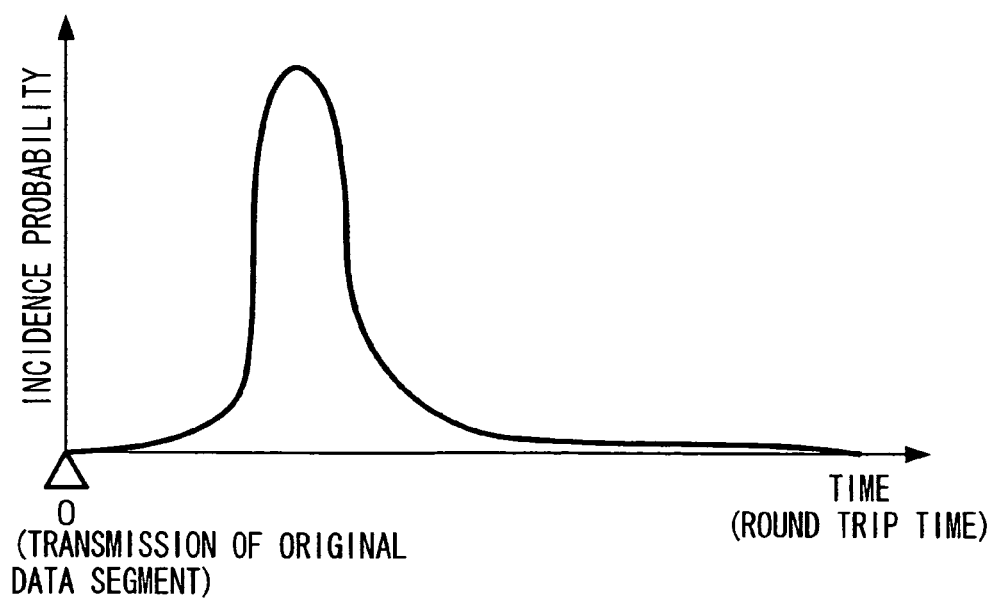
FIG. 3 is a diagram showing a schematic probability distribution according to the embodiments (a probability distribution 1 according to the second embodiment) according to the embodiments.

HD 104 stores probability distribution data (see FIG. 3) showing incidence probabilities of an RTT (round trip time), measured by timer 100a, from a time of transmission of a data segment until a time of reception of an acknowledgement of receipt of the data segment when communication is performed under normal conditions. FIG. 3 shows incidence probabilities of an RTT for each data segment, a transmission time of a data segment being a starting point.

When the communication is performed under normal conditions, an RTT for an original data segment (hereinafter referred to as O1-RTT) is likely to be the same as an RTT for an acknowledgement received for a retransmitted data segment after the retransmission of the original data segment (hereinafter referred to as S1-RTT), as described in the following.

Figure 4:
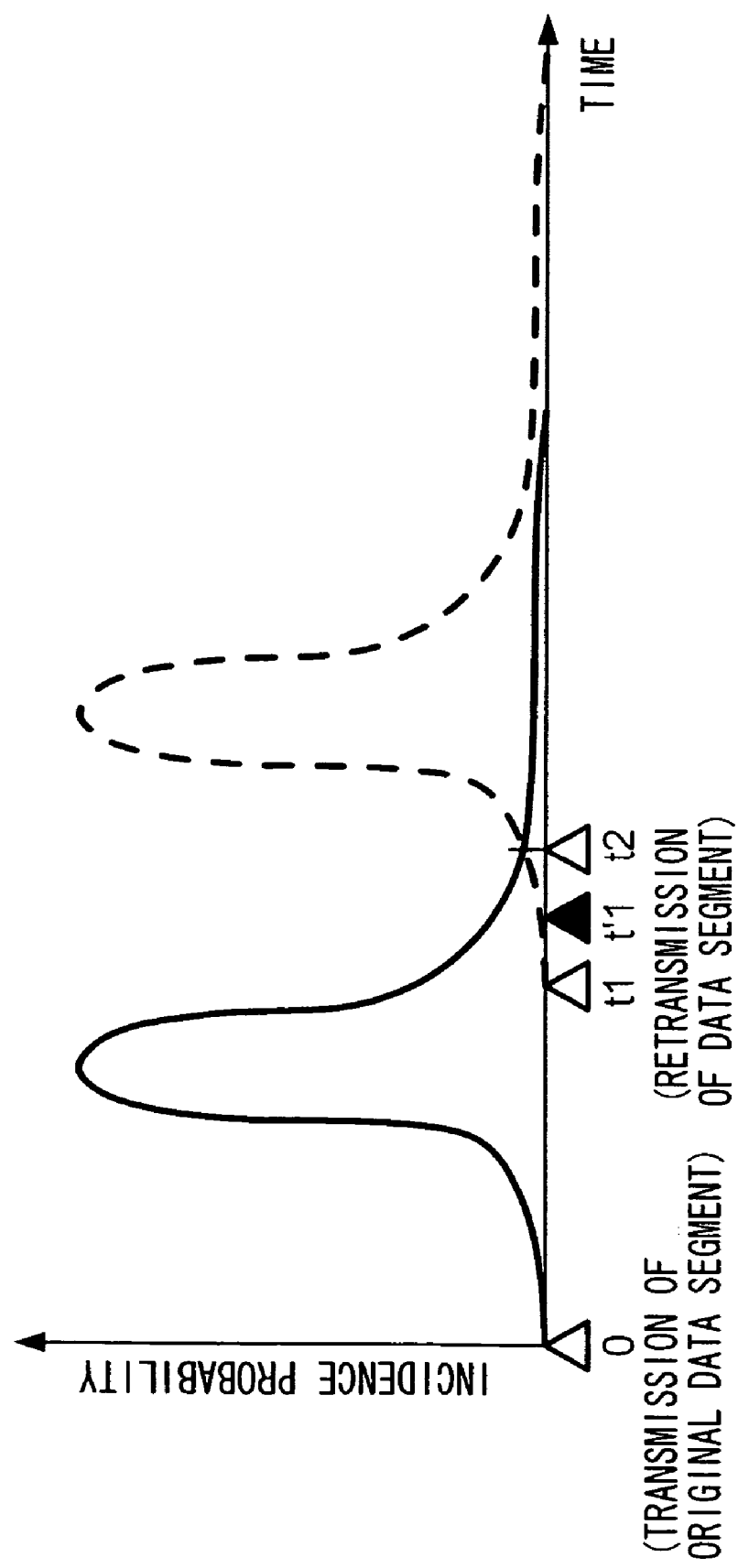
FIG. 4 is a diagram for describing incidence probabilities using the probability distribution.

FIG. 4 shows probability distribution of O1-RTTs in a solid line and of S1-RTTs in a dashed line. In the figure, time t1 is a time at which a data segment is retransmitted. At time t2, the incidence probability of O1-RTTs becomes equal to the incidence probability of S1-RTTs. Thus, it can be inferred from the figure that there is a higher probability of receiving an acknowledgement for an original data segment before a certain time (before time t2 in the example shown in the figure), and that there is a higher probability of receiving an acknowledgement for a retransmitted data segment after time t2. In the present embodiment, two probability distributions having the same curve are used to estimate whether an acknowledgement received after retransmission of a data segment corresponds to the original data segment or to the retransmitted data segment.

Further, HD 104 stores an update program for causing CPU 100 to update the probability distribution data. Specifically, the update program causes CPU 100 to perform the following processes. CPU 100 causes timer 100a to measure an RTT from a time that server device 10 transmits a data segment to client device 50 to the time that an acknowledgement for the data segment is received from client device 50. An incidence probability of the measured RTT is calculated, and data of probability distribution stored in HD 104 is updated every time the calculation is performed.

Additionally or alternatively, the probability distribution data may be updated using time values measured by timer 100b where it is determined that a first acknowledgement received after retransmitting a data segment, in the case of the timeout, corresponds to the retransmitted data segment. It is determined on the basis of a value measured by timer 100b being larger than the value of t2 in FIG. 4, and further on the basis of a second acknowledgement having the same acknowledgement number as the first acknowledgement not having been received.

It is to be noted that CPU 100 may start communication between server device 10 and client device 50 and then generate probability distribution data. Alternatively, probability distribution data may be generated on the basis of statistics obtained before the communication is started. Specifically, the following three methods may be employed.

In a first method, test data segments are transmitted in an initial phase of the communication between server device 10 and client device 50, and probability distribution data is generated on the basis of test data segments and their corresponding acknowledgements exchanged during the phase. Transmission of data segments for transmission is started after a predetermined test phase has elapsed. In a case where retransmission of a data segment is required, the above determination is performed using the probability distribution data obtained using test data segments. The probability distribution data is updated each time timer 100a obtains an RTT.

In a second method, transmission of data segments for transmission is started at commencement of communication between server device 10 and client device 50. In this case, the determination is not performed for a certain period since no probability distribution data is available. During the initial period, probability distribution data is generated. Since, in this method, the determination according to the present embodiment is performed after a certain period has elapsed from the start of communication, the effects of the present embodiment are expected when a relatively long communication is performed.

In a third method, transmission of data segments for transmission is started at commencement of communication between server device 10 and client device 50, as in the second method, but the determination is performed using existing probability distribution data pre-obtained in a similar communication environment. In this case, RTTs obtained after communication is started are used to update the existing probability distribution data.

In any of the above methods, in a case where there is more than one client device 50 (not shown), CPU 100 of server device 10 updates probability distribution data for the IP address of each client device 50.

As has been described, server device 10 according to the present embodiment measures an elapsed time from retransmission of a data segment until reception of an acknowledgement, and estimates whether the acknowledgement is for an original data segment or for a retransmitted data segment, by determining, on the basis of the updated data of probability distribution, whether the measured elapsed time is more likely to be O1-RTT or S1-RTT.

Configuration of Client Device 50:

A description will be given only of functions relating to the present embodiment since client device 50 is configured in the same way as a standard computer.

Client device 50 has a function of, upon receiving a data segment from server device 10, transmitting an acknowledgement indicating that it has received the data segment. Specifically, client device 50 sets, in the acknowledgement number field of a data header of an acknowledgement, a sequence number of a data segment which it expects to receive next, and transmits the acknowledgement to server device 10.

2. Operation

Next, a description will be given of an operation of the present embodiment.

Figure 5:
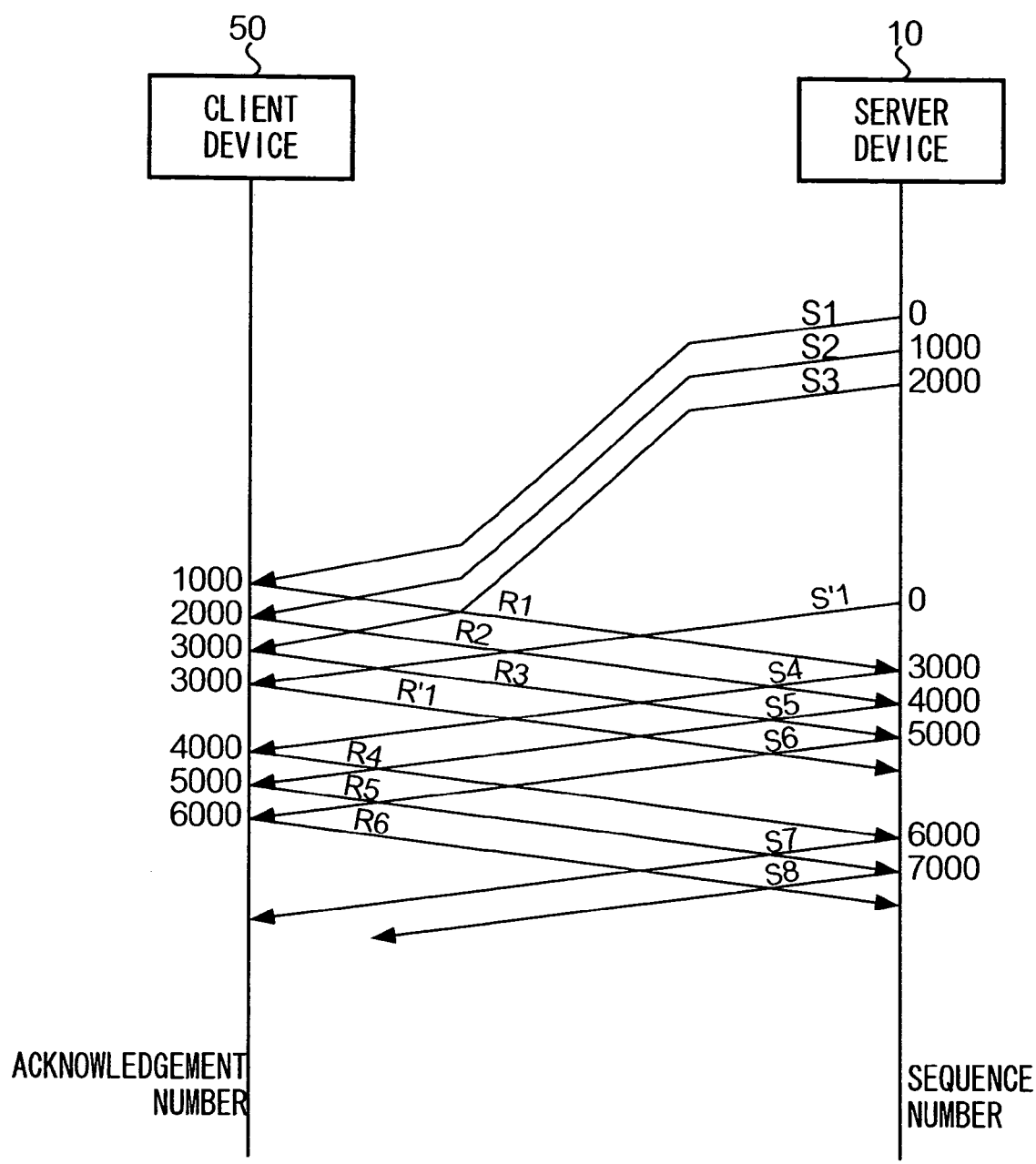
FIG. 5 is a sequence chart showing an example where a packet communication is performed between server device 10 and a client device 50 according to the embodiments.
Figure 6:
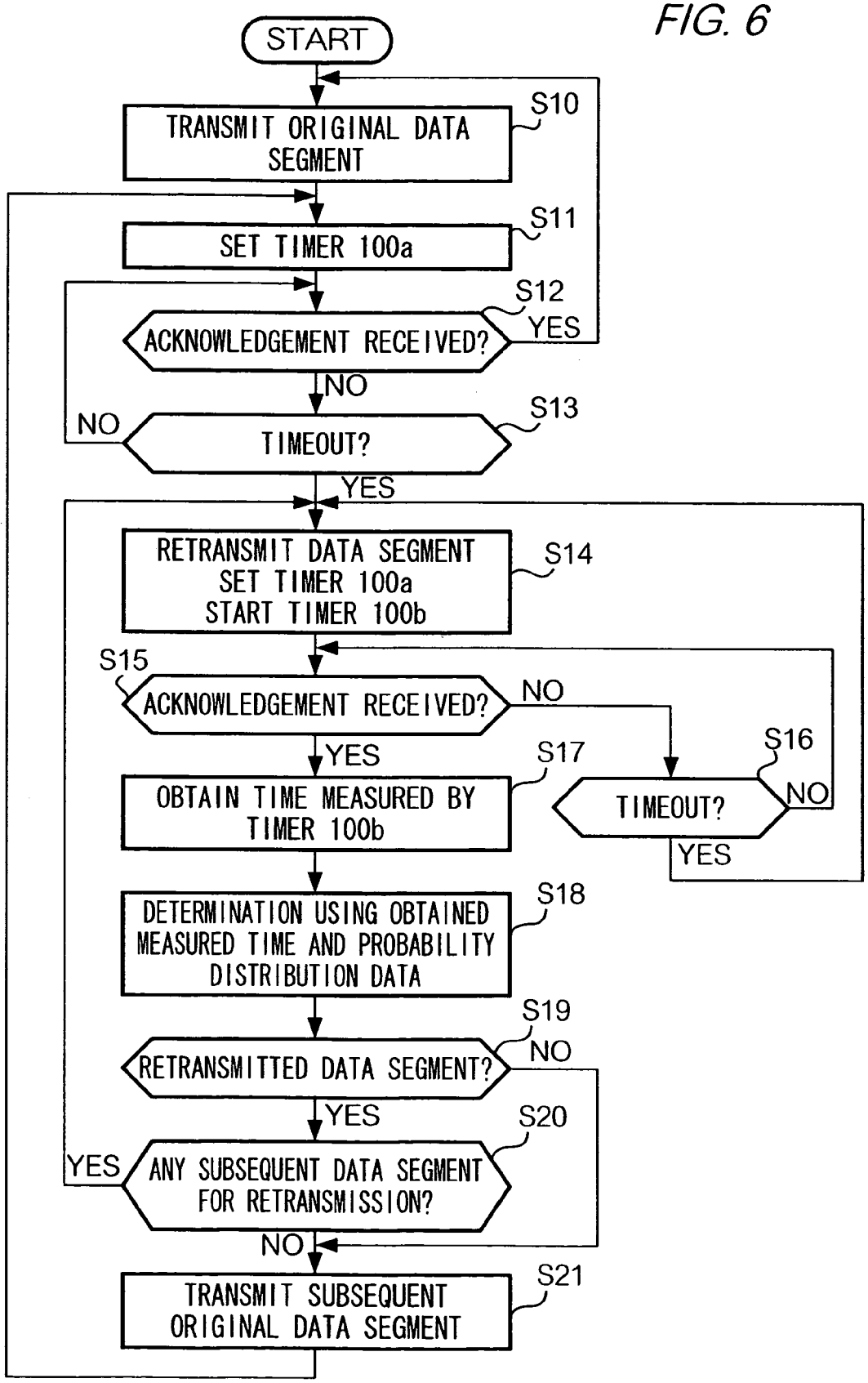
FIG. 6 is a flow chart showing transmission and reception operations of data segments at server device 10 according to the embodiments.

FIG. 5 is a sequence chart showing an example of performing a packet communication between server device 10 and client device 50. FIG. 6 is a flow chart showing an example operation of transmitting and receiving a data segment at server device 10 according to the present embodiment. In the present embodiment, data segments are transmitted using a sliding window. For simplicity, it is assumed in this example that the window size is three at the time of starting transmission. It is further assumed that the amount of data segments that client device 50 is able to receive is sufficiently large relative to the window size set by server device 10.

Further, CPU 100 of server device 10 executes the update program stored in HD 104 every time it transmits or receives data, thereby updating the probability distribution data.

In FIG. 5, three data segments (original data segments S1, S2, and S3) are transmitted from server device 10 to client device 50, the segments S1, S2, and S3 having sequence numbers of 0, 1000, 2000, respectively. Three data segments are transmitted because the window size is set as three.

In the example shown in the figure, after the transmission, a radio communication environment in a wireless section included in a communication section between communication terminal 40 and mobile packet communication network 30 deteriorates. As a result, transmission of the original data segments S1, S2, and S3 is suspended. The original data segments S1, S2, and S3 are then temporarily stored in a node in mobile packet communication network 30. Once the radio environment is improved and communication via mobile packet communication network 30 is restored, the original data segments S1, S2, and S3 are transmitted to client device 50. That is, the original data segments S1, S2, and S3 are transmitted after a delay through mobile packet communication network 30 to client device 50 and reach client device 50 with significant delay after their transmission. Then, an acknowledgement R1 having acknowledgement number 1000 is transmitted from client device 50 to server device 10 in response to receipt of the original data segment S1.

A detailed description will be now given describing an operation performed by server device 10, and corresponding to the above example. In Step S10 of FIG. 6, CPU 100 of server device 10 transmits the original data segments S1, S2, and S3. Subsequently, CPU 100 assigns timer 100*a* a timeout value to cause it to measure an elapsed time (Step S11), and waits for an acknowledgement transmitted from client device 50 in response to receipt of the original data segment S1.

CPU 100 then determines whether any acknowledgment is received (Step S12). When it is determined "No" in Step S12, CPU 100 then determines whether a timeout by timer 100*a* occurs (Step S13). In a case that it is determined "No" in Step S13, the routine returns to Step S12. The determination of Steps S12 and S13 is repeated by CPU 100 before a timeout occurs as far as no acknowledgement is received.

In the example, the elapsed time reaches a timeout value before the acknowledgement R1 is received. In this case, a trigger signal is output from timer 100*a* after an elapsed time measured by timer 100*a* reaches a timeout value without receiving an acknowledgement (Step S12; No, Step S13; Yes). CPU 100 then resets timer 100*a*, and the routine proceeds to Step S14.

In Step S14, CPU 100 determines that the original data segment S1 has not been received by client device 50 and retransmits a data segment having sequence number 0 (retransmitted data segment S'1 in FIG. 5) to client device 50. CPU 100 also assigns a timeout value to timer 100*a* and causes it to measure an elapsed time. At the same time, timer 100*b* is started and caused to measure an elapsed time.

CPU 100 then determines whether any acknowledgment is received (Step S15), and in a case that it is determined "No" in Step S15, CPU 100 then determines whether a timeout by timer 100*a* occurs (Step S16). When the determination of Step S16 is "No," the routine returns to Step S15. After this, the determination of Steps S15 and S16 is repeated by CPU 100 before a timeout occurs as far as no acknowledgement is received.

It is assumed that CPU 100 subsequently receives the acknowledgment R1 before the timeout value is reached, i.e., before a trigger signal is output from timer 100*a*, where it is determined "Yes" in Step S15, and the routine proceeds to Step S17.

In Step S17, CPU 100 causes timer 100*b* to stop measuring the elapsed time. It is then determined whether there is a higher probability of the acknowledgement R1 being an acknowledgement of the original data segment S1 or of the retransmitted data segment S'1, on the basis of the measured elapsed time and the data of probability distribution stored in HD 104 (Step S18).

Specifically, as explained in the description of the "configuration of server device 10", a determination is made whether the elapsed time measured in Step S17 is likely to be S1-RTT or O1-RTT by utilizing the relations between two types of probability distribution data as shown in FIG. 4.

In one preferred embodiment, HD 104 stores one type of probability distribution data as shown in FIG. 3. CPU 100 compares the value of an elapsed time measured by timer 100*b* with the stored probability distribution data to obtain an incidence probability of S1-RTT corresponding to the measured value. Also, a timeout value assigned to timer 100*a* is added to the value measured by timer 100*b*, where the retransmission of a data segment is caused when the timeout value is reached. Then, CPU 100 obtains, based on the probability distribution data, an incidence probability of O1-RTT that corresponds to the value obtained by adding the timeout value and the measured value. In a case that the incidence probability of S1-RTT is equal to or larger than that of O1-RTT, it is determined that the acknowledgement R1 is transmitted in response to receipt of the retransmitted data segment. Conversely, in a case that the incidence probability of S1-RTT is smaller than that of O1-RTT, it is determined that the acknowledgement R1 is transmitted in response to receipt of the original data segment.

In another preferred embodiment, HD 104 stores two types of probability distribution data as shown in FIG. 4. CPU 100 first adds a timeout value set on timer 100*a* to the value measured by timer 100*b*, where the retransmission of a data segment is caused when the timeout value is reached, and compares the value obtained by adding the timeout value and the measured value with the probability distribution data for O1-RTT (the solid line of FIG. 4) to obtain an incidence probability for O1-RTT corresponding to the measured value plus the timeout value. Also, CPU 100 obtains, based on the probability distribution data for S1-RTT (the dashed line of FIG. 4), an incidence probability of S1-RTT that corresponds to the value obtained by adding the timeout value and the measured value. In a case that the incidence probability obtained by referring to the probability distribution data of S1-RTT is equal to or larger than that of O1-RTT, it is determined that the acknowledgement R1 is transmitted in response to receipt of the retransmitted data segment. Conversely, in a case that the incidence probability of S1-RTT is smaller than that of O1-RTT, it is determined that the acknowledgement R1 is transmitted in response to receipt of the original data segment. In a case of using two curves, as shown in FIG. 4, a merging point of the probability distribution data for S1-RTT and that for O1-RTT (t2 of FIG. 4) may be regarded as a threshold value. In this case, when the value measured by timer 100*b*, added to the timeout value, is smaller than the threshold value, it is determined that the acknowledgement R1 is transmitted in response to receipt of the original data segment. When the value measured by timer 100b, added to the timeout value, is equal to or larger than the threshold value, it is determined that the acknowledgement R1 is transmitted in response to receipt of the retransmitted data segment.

For example, if the time measured in S17 plus the timeout value is -t'1, there is a higher probability of the acknowledgement R1 corresponding to O1-RTT as shown in FIG. 4.

Thus, CPU 100 determines that the acknowledgement R1 is more likely to correspond to the original data segment S1, and the routine proceeds to Step S21. In this case, since an acknowledgement for the original data segment S1 is received, the window slides by one data segment. As a result, one subsequent data segment can now be sent. Thus, in Step S21, an original data segment having a subsequent sequence number 3000 (S4 in FIG. 5) is transmitted. The routine then moves to Step S11 and further to Step S12.

Returning to FIG. 5, an original data segment S4 is transmitted from server device 10 to client device 50, the process corresponding to Step S21 of FIG. 6. The routine then returns to Step S11, and timer 100a starts to measure an elapsed time. After this, the determination of Steps S12 and S13 is repeated by CPU 100 before a timeout occurs when no acknowledgement is received.

On the other hand, the original data segment S2 is received by client device 50, and an acknowledgement R2 having acknowledgement number 2000 is transmitted from client device 50 to server device 10 as a response to receipt of the original data segment S2, while the above routine is being performed by server device 10.

Referring again to FIG. 6, the determination of Step S12 by CPU 100 of server device 100 becomes "Yes" when the acknowledgement R2 having an acknowledgement number 2000 reaches server device 10. As a result, the window slides further by one data segment, and an original data segment having a subsequent sequence number 4000 (S5 in FIG. 5) is transmitted (Step S10).

In FIG. 5, an original data segment S5 is transmitted from server device 10 to original data segment S5, the process corresponding to Step S10.

It is to be noted that in Step S19 of FIG. 6, the routine proceeds to Step S20 when CPU 100 determines that there is a higher probability that an acknowledgement corresponds to a retransmitted data segment. In Step S20, it is determined whether there is a subsequent data segment for retransmission. In the case that there is, the routine proceeds to Step S14; and in the case that there is no data segment for retransmission, the routine proceeds to Step S21.

B. Second Embodiment

Next, a description will be given of another example where packet communications are performed between a server device having the same configuration as in the first embodiment and client device 50, with reference to FIGS. 1–8.

In the second embodiment, in addition to the probability distribution used in the first embodiment (hereinafter referred to as "probability distribution 1"), another probability distribution (hereinafter referred to as "probability distribution 2") is used in the determination in Step S18 in FIG. 6.

Figure 7:
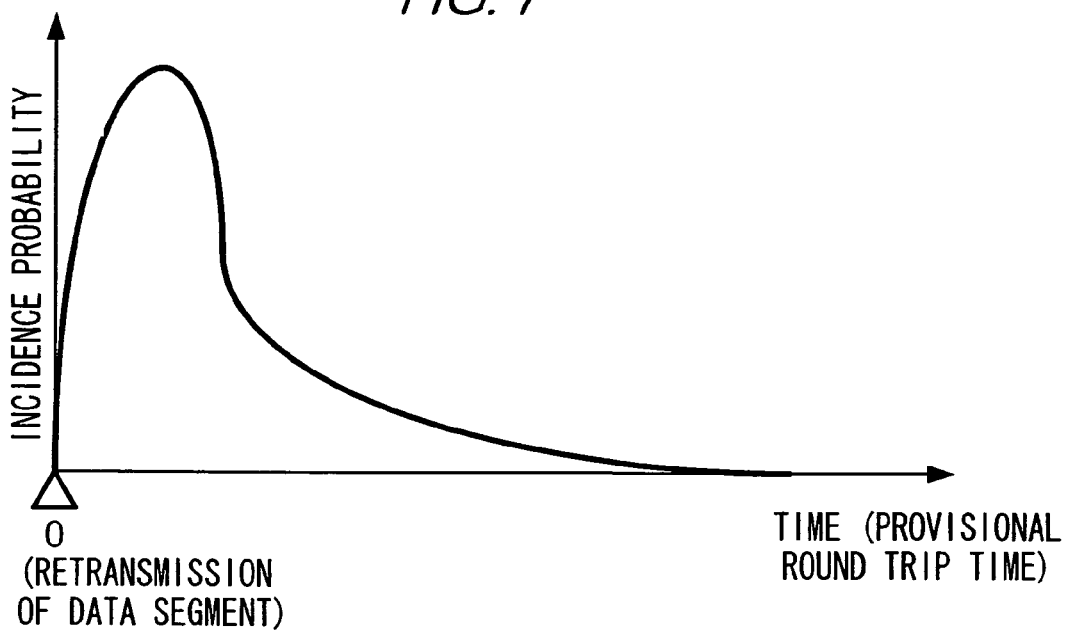
FIG. 7 is schematic probability distribution 2 according to the second embodiment.

An example of the probability distribution 2 is shown in FIG. 7. The probability distribution 2 shows incidence probabilities of time (hereinafter referred to as "a provisional RTT (round trip time)") required from retransmission of a data segment caused by the timeout until a first acknowledgement is received where the acknowledgement is determined to correspond to an original data segment.

In contrast, the probability distribution 1 shows incidence probabilities of RTTs obtained, where the transmission time of an original data segment is a starting point. Since the conditions in a communication path are not necessarily the same during the transmission time of the original data segment and that of the retransmitted data segment, the use of the probability distribution 2 in the determination in Step 18 is more likely to provide a reliable result than the use of probability distribution 1 for obtaining an incidence probability of an acknowledgement corresponding to receipt of an original data segment.

Thus, in the present embodiment, the probability distribution 1 is used for obtaining probability of a received acknowledgement of receipt of a retransmitted data segment; and the probability distribution 2 is used for obtaining probability of a received acknowledgement of receipt of an original data segment.

1. Configuration

Since the configuration of the second embodiment is similar to that of the first embodiment in its major components, only additional functions used in the second embodiment will be described.

As in the first embodiment, CPU 100 of server device 10 according to the second embodiment has two timers, 100a and 100b (see FIG. 1). Timers 100a and 100b have the same functions as in the first embodiment, but in the second embodiment, the value of an elapsed time measured by timer 100b is used not only for the determination in Step S18 but also for updating the probability distribution 2.

Further, HD 104 stores the probability distribution data 2 in addition to the probability distribution data 1. Likewise, HD 104 stores, in addition to the update program for updating the probability distribution 1 (hereinafter referred to as a "first update program"), an update program for causing CPU 100 to update the probability distribution 2 (hereinafter referred to as a "second update program").

In the second update program, CPU 100 updates the probability distribution data 2 stored in HD 104 with the value of an elapsed time measured by timer 100b in the case that it is determined that it is more probable that an acknowledgement received after the retransmission of a data segment corresponds to an original data segment. Specifically, CPU 100 obtains an incidence probability of the elapsed time measured by timer 100b, the time being a provisional RTT for an original data segment. The obtained incidence probability is used to update the probability distribution data 2 each time such an incidence probability is obtained. It is to be noted that various methods of updating the probability distribution data 2 may be envisioned, such as recalculating the data together with previous values measured by timer 100b.

The phrase used in the previous paragraph, "in the case that it is determined that it is more probable that an acknowledgement received after the retransmission of a data segment corresponds to an original data segment" will be described here in more detail. In a case that CPU 100 receives acknowledgements for receipt of both an original data segment (R1 in FIG. 5) and a retransmitted data segment (R'1 in FIG. 5) after retransmission of the data segment, the device 10 naturally receives the acknowledgement R1 first and then receives the acknowledgement R'1. The determination in Step S18 in FIG. 6 is performed at the time of receiving the acknowledgement R1, and at this point, it is not possible to determine with certainty whether the acknowledgement R1 pertains to the original data segment, though it is possible to make an estimation. When the second acknowledgement R'1 is received CPU 100 is able to ascertain whether the determination of Step S18 was correct or incorrect. Therefore, in the present embodiment, the updating of the probability distribution 2 with the value measured by timer 100b is performed when the second acknowledgement R'1 is received.

In actuality, as shown in FIG. 5, the acknowledgement number contained in the acknowledgement R'1 is different from that in the first acknowledgement R1 because it is after client device 50 receives the original data segments S1, S2, and S3 that the device 50 receives the retransmitted data segment S'1. Therefore, CPU 100 of server device 10 updates the probability distribution data 2 when two acknowledgements having the same acknowledgement number (R3 and R'1 in FIG. 5) are received.

The updating of the probability distribution data 2 may be performed under one of the three methods that have been described with respect to the first embodiment. In the first method, after the communication between server device 10 and client device 50 is initiated, test data segments are transmitted for a certain period. In a case where a test data segment needs to be retransmitted, the probability distribution data 2 may be generated based on a provisional RTT obtained by timer 100b.

In the second method, the probability distribution data 2 is generated after the start of the communication. In this method, the determination is not performed for a while after the start of the communication since the probability distribution data 2 is not available, but the determination is started after a predetermined time period has elapsed. In a case where a data segment needs to be retransmitted, timer 100b is caused to measure an elapsed time, and the time required until reception of a first acknowledgement is measured. The probability distribution data 2 is generated using the measured time value when server device 100 receives two acknowledgements having the same acknowledgement number.

In the third method, the above determination is started immediately after the communication is initiated, by using probability distribution data 2 that is measured in advance in a communication performed in a similar environment. Specifically, the probability distribution data 2 may be generated before the start of the communication by using a Time Stamp Option described in the background art to determine whether an acknowledgement received after the retransmission of a data segment corresponds to the original data segment or to the retransmitted data segment. The pre-generated probability distribution data 2 is updated after the communication is started.

It is to be noted that Time Stamp Option may be used when test data segments are transmitted in the first method and also used before the determination is started when the generation of the probability distribution data is being performed in the second method.

Figure 8:
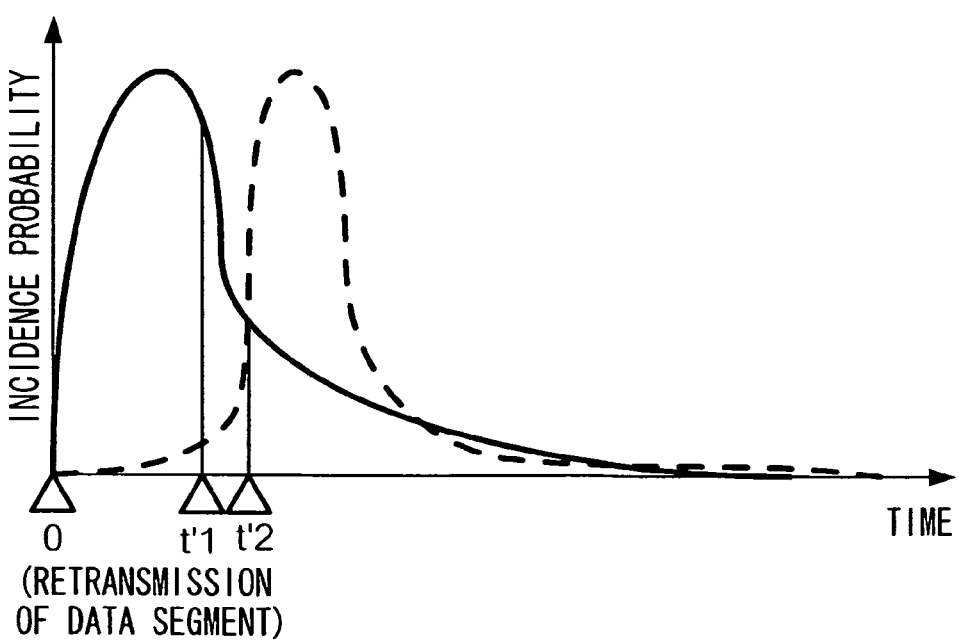
FIG. 8 is a diagram for describing incidence probabilities using the probability distribution 1 and the probability distribution 2 according to the second embodiment.
Figure 9:
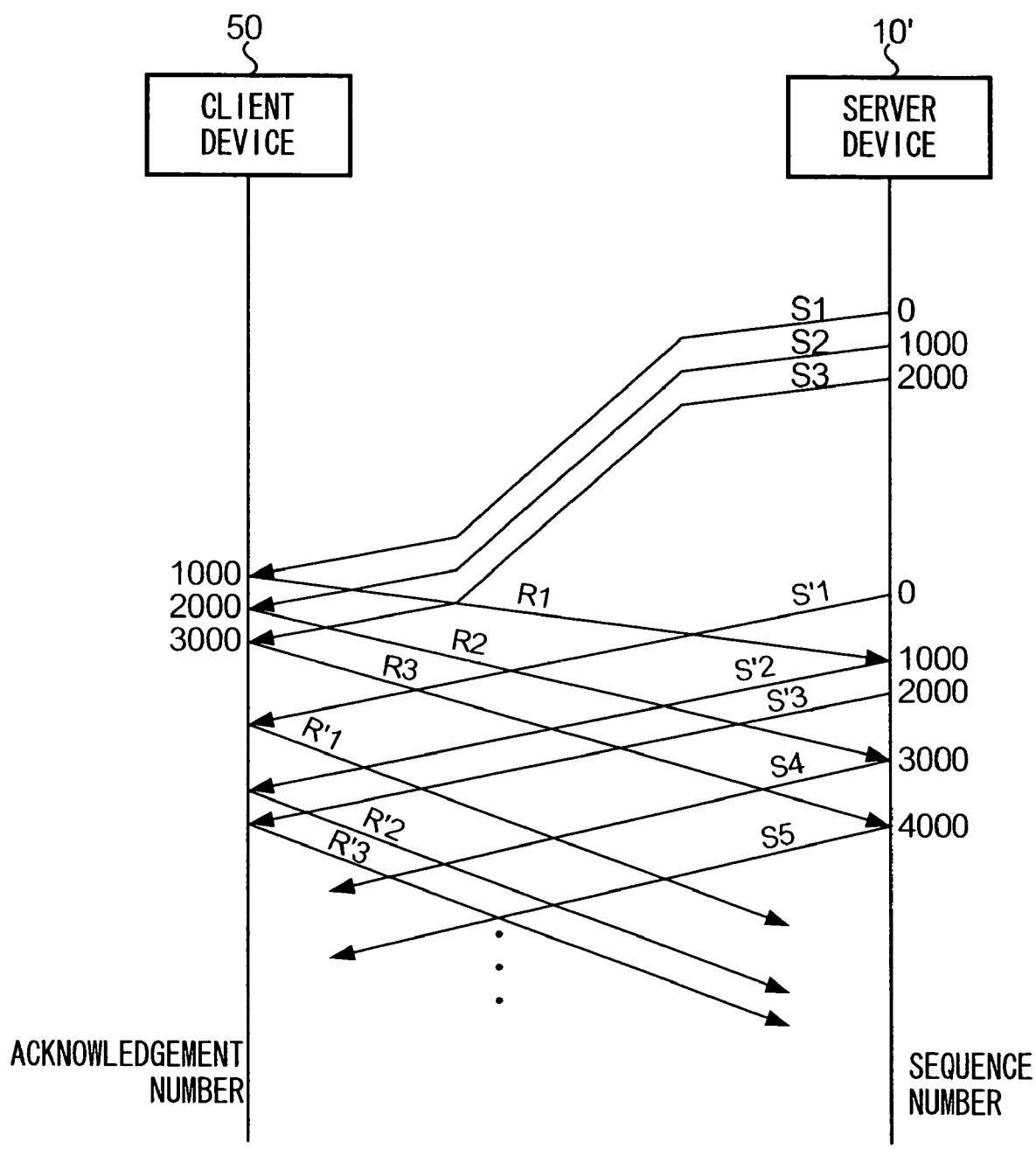
FIG. 9 is a sequence chart showing an example where a packet communication is performed between a conventional server device 10' and client device 50.

The following assumptions may be made using the probability distribution 1 and 2. In a case that the communication is being performed in normal conditions, an RTT from retransmission of a data segment until reception of an acknowledgement of receipt of the retransmitted data segment (hereinafter referred to as "S2-RTT") can be represented by the probability distribution 1 (see FIG. 3). Also, a provisional RTT from retransmission of a data segment until reception of an acknowledgement of receipt of the original data segment (hereinafter referred to as "O2-pRTT") can be represented by the probability distribution 2 (see FIG. 7). FIG. 8 shows probability distribution of O2-pTTs (probability distribution 2) in a solid line and that of S1-RTTs (probability distribution 1) in a dashed line. In the figure, a time t'2 being a merging point of two curves is a time at which incidence probability of O2-RTTs becomes equal to that of S1-RTTs. It can be inferred from the figure that there is a higher probability of receiving an acknowledgement for an original data segment after retransmission of the original data segment before time t'2, and that there is a higher probability of receiving an acknowledgement for the retransmitted data segment after time t'2. These characteristics are used to perform the determination of Step S18 in FIG. 6 on the basis of both the probability distribution 1 and 2.

In a case that there is a plurality of client devices 50 (not shown), CPU 100 performs the probability distribution 2 for the IP address of each client device 50.

2. Operation

Next, a description will be given of an operation of the second embodiment.

The operation of the second embodiment is the same as that of the first embodiment except for the detailed process of the determination of Step S18 of FIG. 6. Therefore, only the details of the determination process will be described.

The determination of Step S18 is performed as follows. CPU 100 compares the elapsed time measured by timer 100b with the probability distribution data 1 and the probability distribution data 2. Then, an incidence probability corresponding to the measured value is obtained for each of probability distribution data 1 and 2. In a case that the incidence probability obtained by referring to the probability distribution 1 is equal to or larger than that obtained by referring to the probability distribution 2, it is determined that the acknowledgement R1 is transmitted in response to receipt of the retransmitted data segment. Conversely, when the former is smaller than the latter, it is determined that the acknowledgement R1 is transmitted in response to receipt of the original data segment. Alternatively, a merging point of the two curves (t2 of FIG. 8) respectively showing the probability distribution data 1 and 2 may be determined as a threshold value. When the time measured by timer 100b is smaller than the threshold value, it is determined that the acknowledgement R1 corresponds to the original data segment; and when the time measured by timer 100b is equal to or larger than the threshold value, it is determined that the acknowledgement R1 corresponds to the retransmitted data segment.

In an example shown in FIG. 8, the acknowledgement R1 is received at a time t'1, and therefore, it is determined that the acknowledgement is more likely to correspond to the original data segment (Step S19; No). The routine then proceeds to a next step.

Further, after the determination of Step S18 is performed, the probability distribution data 2 is updated when two acknowledgements having the same acknowledgement number are received, as a specific process performed in the present embodiment. As described above, this process is performed because the determination made in Step S18 is ascertained when two identical acknowledgements are received.

C. Modifications

In the foregoing, a preferred embodiment of the present invention has been described. The present invention may be implemented in various other embodiments without departing from the main characteristics of the invention. The following are example modifications.

In the above preferred embodiments, a packet communication is performed according to TCP. However, the present invention may be applied to a communication protocol for packet communications other than TCP if it performs retransmission control of a data block or a data segment. In this case, data segments may be transmitted using a window that is similar to a sliding window method used in TCP.

In the above embodiment, server device 10 obtains and updates, for each IP address, the probability distribution 1 and 2. Alternatively, the probability distribution data 1 and 2 may be obtained for each subnetwork. Further, in a case that there is more than one mobile packet communication networks 30, the probability distribution 1 and 2 may be obtained for each mobile packet communication network. Since conditions may vary depending on a communication network, more reliable results of the determination can be expected if the probability distribution data 1 and 2 are generated for each communication network and the determination is performed on the basis of the generated data.

A separate server device may replace the functions of obtaining the probability distribution 1 and 2 and determining which data segment corresponds to a received acknowledgement. In such a case, server device 10, upon receiving an acknowledgement after transmitting a data segment for retransmission, inquires of a separate server device whether the acknowledgement corresponds to an original data segment or to the retransmitted data segment. The separate service device performs the determination which is performed by Server device 10 in the above embodiments and transmits a result of the determination to server device 10. Server device 10 then is able to estimate which data segment corresponds to the acknowledgement on the basis of the received result of the determination.

In the above embodiment, client device 50 performs packet communications with server device 10 through communication terminal 40. Further, client device 50 may have a wireless communication function and perform packet communications with server device 10 through mobile packet communication network 30, the Internet 20, and not through communication terminal 40.

The invention claimed is:

1. A transmission control method for use in a communication network, comprising:
   generating first probability distribution data showing incidence probabilities of data block round trip times;
   transmitting sequentially a plurality of data blocks from a sender device to a receiver device;
   retransmitting, from said sender device, a data block, from among said plurality of data blocks, for which no acknowledgement is received and initializing a time keeping means for measuring an elapsed time;
   obtaining, upon receiving an acknowledgement signal from said receiver device, said elapsed time measured by said time keeping means; and
   estimating whether said acknowledgement signal acknowledges receipt of one of said plurality of data blocks on the basis of a value of said obtained elapsed time and said first probability distribution,
   wherein said transmitting step includes further transmitting a data block subsequent to said transmitted plurality of data blocks when it is estimated that in said estimating step that said acknowledgement signal acknowledges reception of one of said plurality of data blocks.

2. A data transmission method according to claim 1, further comprising:
   generating second probability distribution data showing incidence probabilities of said elapsed time using said obtained value of said elapsed time when it is determined that said estimation performed in said estimating step is correct,
   wherein said estimating step includes performing said estimation on the basis of said obtained value of said elapsed time, and said first and second probability distribution data.

3. A communication device comprising:
   first generation means for generating first probability distribution data showing incidence probabilities of data block round trip times;
   transmission means for transmitting sequentially a plurality of data blocks to a receiver device;
   time keeping means for measuring an elapsed time;
   retransmission means for retransmitting a data block, from among said plurality of data blocks, for which no acknowledgement is received and initializing said time keeping means;
   obtaining means for obtaining, upon receiving an acknowledgement signal from said receiver device, said elapsed time measured by said time keeping means; and
   estimation means for estimating whether said acknowledgement signal acknowledges receipt of one of said plurality of data blocks on the basis of a value of said obtained elapsed time and said first probability distribution,
   wherein said transmitting means further transmits a data block subsequent to said transmitted plurality of data blocks when it is estimated in said estimation step that said acknowledgement signal acknowledges receipt of one of said plurality of data blocks.

4. A communication device according to claim 3,
   wherein said plurality of data blocks is transmitted to a plurality of said receiver devices;
   wherein said first generation means generates said first probability distribution data for each of a plurality of connections established with said plurality of receiver devices; and
   wherein said estimation means performs said estimation, upon receiving an acknowledgment from one of said plurality of receiver devices, on the basis of said first probability distribution data generated for one of said plurality of connections that is established with said one of said plurality of receiver devices.

5. A communication device according to claim 3,
   wherein said plurality of data blocks is transmitted to a plurality of said receiver devices each belonging to different subnetworks;
   wherein said first generation means generates said first probability distribution data for each of said subnetworks; and
   wherein said estimation means performs said estimation, upon receiving an acknowledgment from one of said plurality of receiver devices, on the basis of said first probability distribution data generated for one of said subnetworks to which said one of said plurality of receiver devices belongs.

6. A communication device according to any one of claims 3–5,
   wherein said first probability distribution data is statistical information obtained before transmitting said plurality of data blocks; and
   wherein said first generation means generates said first probability distribution data by updating said obtained statistical information after transmission of said plurality of data blocks is started.

7. A communication device according to any one of claims 3–5, wherein said first probability distribution data is statistical information obtained before starting communication for transmitting said plurality of data blocks; and wherein said first generation means generates said first probability distribution data by updating said statistical information after starting communication for transmitting said plurality of data blocks.

8. A communication device according to claim 3, further comprising:

second generation means for generating second probability distribution data showing incidence probabilities of said elapsed time using said obtained value of said elapsed time when it is determined that said estimation performed by said estimation means is correct; and wherein said estimating means performs said estimation on the basis of said obtained value of said elapsed time, and said first and second probability distribution data.

9. A communication device according to claim 8, wherein said second generation means determines that said estimation performed by said estimation means is correct when receiving at least two acknowledgment signals requesting said subsequent data block.

10. A communication device according to claim 9, wherein said plurality of data blocks is transmitted to a plurality of said receiver devices;

wherein said first and said second generation means generate said first and said second probability distribution data, respectively, for each of a plurality of connections established with said plurality of receiver devices; and wherein said estimation means performs said estimation, upon receiving an acknowledgment from one of said plurality of receiver devices, on the basis of said first and said second probability distribution data generated for one of said plurality of connections that is established with said one of said plurality of receiver devices.

11. A communication device according to claim 9, wherein said plurality of data blocks is transmitted to a plurality of said receiver devices each belonging to different subnetworks;

wherein said first and said second generation means generate said first and said second probability distribution data, respectively, for each of said subnetworks; and wherein said estimation means performs said estimation, upon receiving an acknowledgment from one of said plurality of receiver devices, on the basis of said first and said second probability distribution data generated for one of said subnetworks to which said one of said plurality of receiver devices belongs.

12. A communication device according to any one of claims 8–11, wherein said first and said second probability distribution data are statistical information obtained before transmitting said plurality of data blocks; and wherein said first and said second generation means generate said first and said second probability distribution data, respectively, by updating said empirically obtained statistical information after transmission of said plurality of data blocks is started.

13. A communication device according to any one of claims 8–11, wherein said first and said second probability distribution data are statistical information obtained before starting communication for transmitting said plurality of data blocks; and wherein said first and said second generation means generate said first and said second probability distribution data, respectively, by updating said statistical information after starting communication for transmitting said plurality of data blocks.

14. A communication device according to claim 8, wherein said plurality of data blocks is transmitted to a plurality of said receiver devices;

wherein said first and said second generation means generate said first and said second probability distribution data, respectively, for each of a plurality of connections established with said plurality of receiver devices; and wherein said estimation means performs said estimation, upon receiving an acknowledgment from one of said plurality of receiver devices, on the basis of said first and said second probability distribution data generated for one of said plurality of connections that is established with said one of said plurality of receiver devices.

15. A communication device according to claim 8, wherein said plurality of data blocks is transmitted to a plurality of said receiver devices each belonging to different subnetworks;

wherein said first and said second generation means generate said first and said second probability distribution data, respectively, for each of said subnetworks; and wherein said estimation means performs said estimation, upon receiving an acknowledgment from one of said plurality of receiver devices, on the basis of said first and said second probability distribution data generated for one of said subnetworks to which said one of said plurality of receiver devices belongs.

16. A communication system comprising:

generation means for generating first probability distribution data showing incidence probabilities of data block round trip times;

transmission means for transmitting sequentially a plurality of data blocks from a sender device to a receiver device;

time keeping means for measuring an elapsed time;

retransmission means for retransmitting a data block, from among said plurality of data blocks, for which no acknowledgement is received and initializing said time keeping means;

obtaining means for obtaining, upon receiving an acknowledgement signal from said receiver device, said elapsed time measured by said time keeping means; and estimation means for estimating whether said acknowledgement signal acknowledges receipt of one of said plurality of data blocks on the basis of a value of said obtained elapsed time and said first probability distribution, wherein said transmitting means further transmits a data block subsequent to said transmitted plurality of data blocks when it is estimated that by said estimation step that said acknowledgement signal acknowledges reception of one of said plurality of data blocks.

17. A program product for causing a computer to execute:
a process of generating first probability distribution data showing incidence probabilities of data block round trip times;
a process of transmitting sequentially a plurality of data blocks from a sender device to a receiver device;
a process of retransmitting, from said sender device, a data block, from among said plurality of data blocks, for which no acknowledgement is received and initializing a time keeping means for measuring an elapsed time;
a process of obtaining, upon receiving an acknowledgement signal from said receiver device, said elapsed time measured by said time keeping means; and
a process of estimating whether said acknowledgement signal acknowledges receipt of one of said plurality of data blocks on the basis of a value of said obtained elapsed time and said first probability distribution, wherein said transmitting process further transmits a data block subsequent to said transmitted plurality of data blocks when it is estimated by said estimating process that said acknowledgement signal acknowledges receipt of one of said plurality of data blocks.

\* \* \* \* \*